(12) United States Patent
Grunnet et al.

(10) Patent No.: US 11,578,695 B2
(45) Date of Patent: Feb. 14, 2023

(54) ROTOR SPEED CONTROL OF A WIND TURBINE

(71) Applicant: VESTAS WIND SYSTEMS A/S, Aarhus N (DK)

(72) Inventors: Jacob Deleuran Grunnet, Tranbjerg J (DK); Tobias Gybel Hovgaard, Ry (DK); Jan-Willem Van Wingerden, Barendrecht (NL); Sebastiaan Mulders, Rotterdam (NL)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 454 days.

(21) Appl. No.: 16/855,159

(22) Filed: Apr. 22, 2020

(65) Prior Publication Data

US 2020/0340450 A1 Oct. 29, 2020

(30) Foreign Application Priority Data

Apr. 24, 2019 (DK) .......................... PA 2019 70248

(51) Int. Cl.
*G05D 3/12* (2006.01)
*G05D 5/00* (2006.01)
(Continued)

(52) U.S. Cl.
CPC ........... *F03D 7/045* (2013.01); *F03D 7/0276* (2013.01); *F03D 7/0296* (2013.01);
(Continued)

(58) Field of Classification Search
CPC ...... F03D 7/0276; F03D 7/0296; F03D 7/045; F05B 2270/101; F05B 2270/334; F05B 2270/404
(Continued)

(56) References Cited

U.S. PATENT DOCUMENTS

| 8,261,599 B2* | 9/2012 | Jeffrey | G01H 1/006 |
| | | | 73/66 |
| 10,956,632 B2* | 3/2021 | Wang | H02J 3/386 |

(Continued)

FOREIGN PATENT DOCUMENTS

| EP | 2679810 A2 | 1/2014 |
| EP | 3088733 A1 | 11/2016 |

(Continued)

OTHER PUBLICATIONS

Danish Patent and Trademark Office First Technical Examination for Application No. PA 2019 70248 dated Oct. 9, 2019.
(Continued)

*Primary Examiner* — Tulsidas C Patel
*Assistant Examiner* — Thomas K Quigley
(74) *Attorney, Agent, or Firm* — Patterson + Sheridan, LLP (57) ABSTRACT

Techniques for controlling rotor speed of a wind turbine. One technique includes defining a system model describing resonance dynamics of a wind turbine component, such as a wind turbine tower, where the system model has a nonlinear input term, e.g. a periodic forcing term. A transform is applied to the system model to obtain a transformed model for response oscillation amplitude of the wind turbine component, where the transformed model has a linear input term. A wind turbine model describing dynamics of the wind turbine is then defined, and includes the transformed model. A model-based control algorithm, e.g. model predictive control, is applied using the wind turbine model to determine at least one control output, e.g. generator torque, and the control output is used to control rotor speed of the wind turbine.

19 Claims, 9 Drawing Sheets

(51) Int. Cl.
*F03D 7/04* (2006.01)
*F03D 7/02* (2006.01)

(52) U.S. Cl.
CPC ... *F05B 2270/101* (2013.01); *F05B 2270/334* (2013.01); *F05B 2270/404* (2013.01)

(58) Field of Classification Search
USPC ........................................................ 700/287
See application file for complete search history.

(56) References Cited

U.S. PATENT DOCUMENTS

| | | | | |
|---|---|---|---|---|
| 2010/0152905 | A1* | 6/2010 | Kusiak | G05B 17/02 700/289 |
| 2011/0229300 | A1* | 9/2011 | Kanev | F03D 7/043 415/33 |
| 2020/0210538 | A1* | 7/2020 | Wang | F03D 17/00 |
| 2021/0232731 | A1* | 7/2021 | Wang | H02J 3/38 |

FOREIGN PATENT DOCUMENTS

| | | |
|---|---|---|
| EP | 3179097 A1 | 6/2017 |
| WO | 2014121800 A1 | 8/2014 |

OTHER PUBLICATIONS

European Patent Extended European Search Report for Application No. 20170382.4-1007 dated Nov. 9, 2020.

Soliman M. et al., "Multiple Model Multiple-input multiple-output predictive control for variable speed variable pitch wind energy conversion systems," IET Renewable Power Generation, vol. 5, No. 2, Mar. 9, 2011, pp. 124-136.

* cited by examiner

ROTOR SPEED CONTROL OF A WIND TURBINE

FIELD OF THE INVENTION

The present invention relates to controlling the rotor speed of a wind turbine and in particular, but not limited to, controlling rotor speed to guard against causing a resonance response oscillation of a component of the wind turbine, e.g. a wind turbine tower.

BACKGROUND

Wind turbines for power generation are well known in the art. One type of wind turbine is a variable speed wind turbine, in which a rotor speed may vary in proportion with a wind speed in order to maximise efficiency of the wind turbine. For variable speed wind turbines, a generator torque and pitch angle of the blades may be controlled so as to maintain different operational parameters, e.g. aerodynamic torque, rotor speed, electrical power, within operational constraints based on design parameters and operating conditions.

One issue with wind turbines, in particular with one or more components of a wind turbine, is that excitation of the resonance frequency of the components may cause relatively large vibrations which, in a worst case scenario, may lead to structural failure of the component. For instance, certain speeds or frequencies of a wind turbine rotor may excite the resonance frequency or oscillation of the tower and/or blades of the wind turbine. In particular, as the wind turbine rotor provides negligible aerodynamic side-to-side damping, at an order of magnitude smaller than the fore-aft damping ratio, then small perturbations can lead to load fluctuations comparable to fore-aft stresses. As the rotor speed varies across different operating points, it can be challenging to ensure that the resonance frequency of one or more of these components is not excited. Imbalance in the rotor may be caused by, for example, blade pitch angle, generator torque, mass of the component or wind speed in the vicinity of the turbine. In particular, the centre of mass of the wind turbine rotor assembly does not coincide with the actual rotor centre as a result of, for example, manufacturing imperfections, wear and tear, fouling and icing. Moreover, vibrations are also induced by rotor aerodynamic imbalances caused by pitch errors and damage to the blade surface.

Conventionally, one or more rotor speed exclusion zones or critical ranges are defined in which a wind turbine rotor is not permitted to operate in. For example, if a wind turbine controller determines that the rotor speed needs to be adjusted from operating at one side of an exclusion zone to the opposite of the exclusion zone in order to improve operating efficiency, then the wind turbine may be controlled so that the rotor speed passes rapidly through the exclusion zone. This, however, can lead to sub-optimal performance of the wind turbine.

Predictive control methods are known to be used in association with wind turbine control technology, in particular to increase or maximise power output of a wind turbine and/or reduce or minimise loading on a wind turbine. Model predictive control is one approach for providing wind turbine control. A predictive controller is provided with a wind turbine model function operating on a number of input variables, and control outputs are derived accordingly, in this case by optimisation. This optimisation may be difficult to achieve in practice if the wind turbine model function is complex. A model for the resonance of one or more wind turbine components, such as the tower, cannot be easily embedded into the wind turbine model function. This is because a resonance model is typically nonlinear and non-convex. A convex problem or model is tractable as there exists a number of highly efficient and reliable methods for solving such problems. This is often a prerequisite for an online, real-time control system, as is relevant for wind turbine control.

It is against this background to which the present invention is set.

SUMMARY OF THE INVENTION

According to an aspect of the invention there is provided a method for controlling rotor speed of a wind turbine. The method comprises defining a system model describing resonance dynamics of a wind turbine component, where the system model has a nonlinear input term. The method comprises applying a transformation to the system model to obtain a transformed representation or model for a response oscillation amplitude of the wind turbine component, where the transformed model has a linear input term. The method comprises defining a wind turbine model describing the wind turbine dynamics, where the wind turbine model includes the transformed model of the wind turbine component. The method includes applying a model-based control algorithm or approach using the wind turbine model to determine at least one control output, and using the at least one control output to control rotor speed of the wind turbine.

The at least one control output may include controlling at least one of generator torque and blade pitch of the wind turbine. The controller may command relevant actuators of the wind turbine to control operation of the wind turbine according to the at least one control output.

By transforming the system model from a model describing resonance dynamics of a wind turbine component to a model describing response oscillation amplitude of the wind turbine component, the forcing term is transformed from a nonlinear term to a linear term. Advantageously, this allows the effect of resonance of the wind turbine component to be included in a model-based control setup for the wind turbine because, unlike inclusion of the system mode, inclusion of the transformed model in the wind turbine model allows for efficient on-line, real time solving of the wind turbine model in a model-based control algorithm. In particular, the transformation of the system model from a nonlinear, non-convex model to a linear, convex model facilitates inclusion of resonance dynamics in the wind turbine model.

In some embodiments, applying the model-based control algorithm comprises predicting response oscillation amplitude of the wind turbine component over a prediction horizon using the wind turbine model, and determining the at least one control output based on the predicted response oscillation amplitude. Predictive control is a particularly convenient way to control operation of the wind turbine. Transformation of the system model into a linear, convex model is particularly useful for use in predictive control as no, or few, efficient methods exist for solving nonlinear, non-convex models on-line.

The method may comprise using the predicted response oscillation amplitude in a cost function of the wind turbine model. The method may comprise optimising the cost function to determine the at least one control output. That is, a term in the predictive control cost function may be included to account for resonance dynamics of the wind turbine component.

The cost function may include a penalty parameter associated with the predicted response oscillation amplitude to penalise operating the wind turbine at rotor speeds corresponding to a resonance response oscillation amplitude of the wind turbine component. Advantageously, operation of the wind turbine at rotor speeds that may cause resonance vibrations of the wind turbine component are therefore discouraged by the predictive control method.

In some embodiments, optimising the cost function comprises determining an optimal trade-off between maximising power production efficiency of the wind turbine and minimising operation of the wind turbine at rotor speeds corresponding to the resonance response oscillation amplitude of the wind turbine component. Advantageously, this means that the wind turbine is prevented or discouraged from operating at rotor speeds that may cause resonance vibrations of the wind turbine component without having an unduly detrimental effect on the power output of the wind turbine.

In some embodiments, optimising the cost function comprises performing a convex optimisation on the cost function.

The transformed model may be a linear parameter varying (LPV) model.

The wind turbine rotor speed may be a scheduling parameter of the LPV model. The scheduling parameter may be determined by iteration until convergence. Advantageously, the iteration may be performed over a longer time period than individual solves of the model-based control algorithm, thereby significantly lowering the computational resources needed without losing a significant amount of performance or accuracy.

In some embodiments, determining the transformed model comprises application of a Wiener approach to the system model, which is a particularly convenient approach to perform the transformation. Other suitable transformations that perform a similar function may also be used, however.

The linear input term in the transformed model may include a periodic frequency varying force applied to the wind turbine component.

The system model may describe a displacement of the wind turbine component.

The wind turbine component may be a wind turbine tower. Alternatively, the wind turbine component may be a wind turbine blade in which the resonance may relate to an edgewise vibration, or a drive train in which the resonance may relate to either structural vibrations or vibrations giving rise to tonal noises.

According to another aspect of the invention there is provided a non-transitory, computer readable storage medium storing instructions thereon that when executed by a processor causes the processor to perform the method described above.

According to another aspect of the invention there is provided a controller for controlling rotor speed of a wind turbine. The controller is configured to define a system model describing resonance dynamics of a wind turbine component, where the system model has a nonlinear input term. The controller is configured to apply a transform to the system model to obtain a transformed model for a response oscillation amplitude of the wind turbine component, where the transformed model has a linear input term. The controller is configured to define a wind turbine model describing dynamics of the wind turbine, where the wind turbine model includes the transformed model of the wind turbine component. The controller is configured to apply a model-based control algorithm using the wind turbine model to determine at least one control output, and to use the at least one control output to control rotor speed of the wind turbine.

According to another aspect of the invention there is provided a wind turbine comprising the controller described above.

BRIEF DESCRIPTION OF THE DRAWINGS

One or more embodiments of the invention will now be described by way of example with reference to the accompanying drawings, in which.

DETAILED DESCRIPTION

Figure 1:
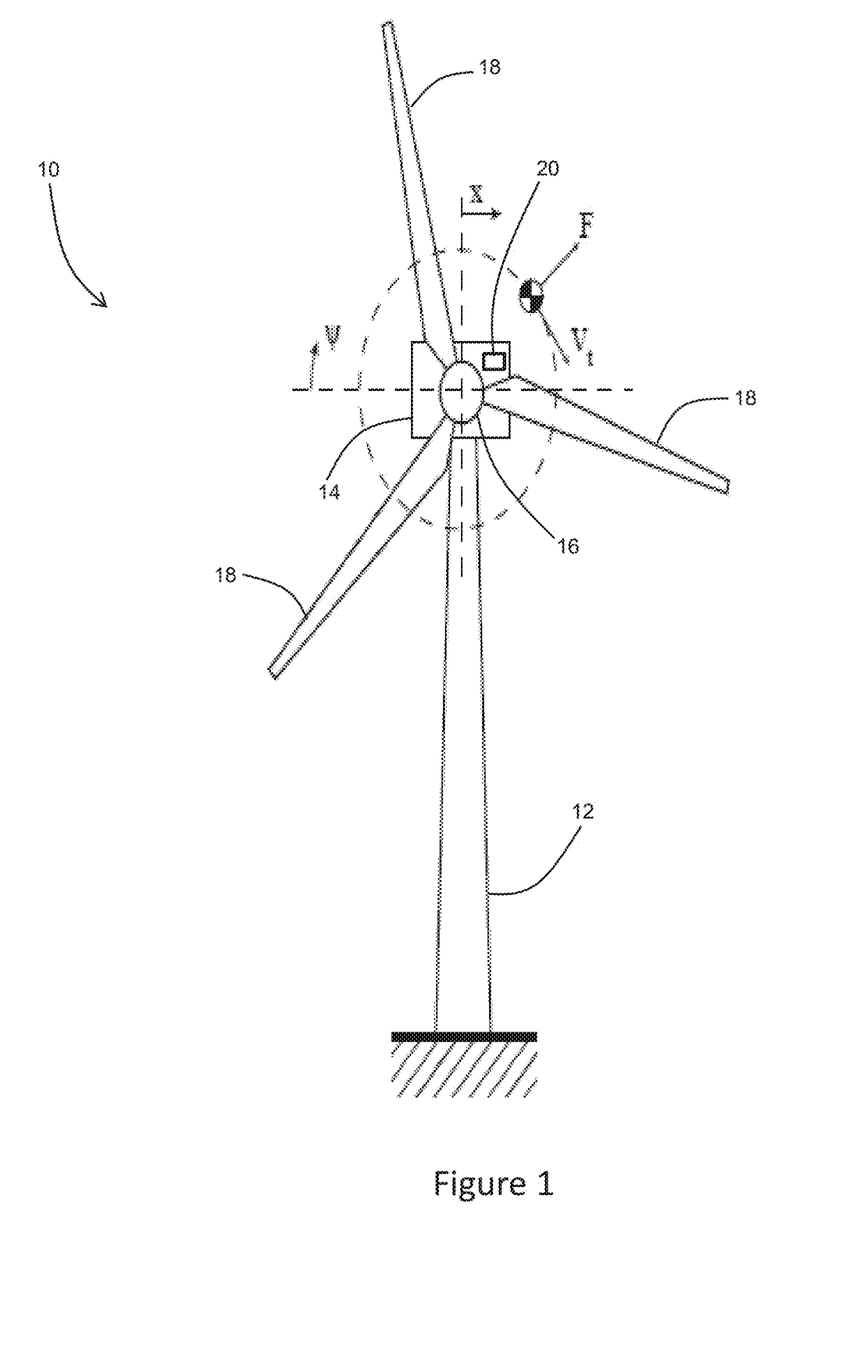
FIG. 1 is a schematic diagram illustrating a front view of a wind turbine having a tower and including a controller according to an embodiment of an aspect of the invention.

FIG. 1 shows a wind turbine 10 according to an embodiment of the invention. The arrangement 10 includes a tower 12, a nacelle 14 rotatably coupled to the top of the tower 12, a rotor including a rotor hub 16 mounted to the nacelle 14, a plurality of wind turbine rotor blades 18 coupled to the rotor hub 16, and a controller 20, or control system, according to an embodiment of an aspect of the invention. The controller 20 is described in greater detail below. The nacelle 14 and rotor blades 18 are turned and directed into the wind direction by a yaw system. In embodiments, the nacelle 14 houses generating components (not shown) of the wind turbine 10, including the generator, gearbox, drivetrain and brake assembly, as well as convertor equipment for converting the kinetic energy of the wind into electrical energy for provision to the grid. In certain wind turbines a gearbox may not be used and at least parts of the convertor equipment may not be placed in the nacelle. The wind turbine 10 is shown in its fully-installed form suitable for operation; in particular, the rotor 16 is mounted on the nacelle 14 and each of the blades 18 are mounted on the rotor and rotor hub 16.

The centre of mass of the rotor 16 may not to coincide with the centre of the rotor 16 because of the arrangement of the blades 18 around the rotor 16, among other reasons such as different blades having different mass. When the wind turbine 10 is operated with variable speed for below-rated conditions, the tower 12 may be excited by a periodic frequency-varying force. The dynamics of the tower may be modelled by a second-order mass-spring-damper system and governed by $$m\ddot{x}(t)+\zeta\dot{x}(t)+kx(t)=a_u \cos(\psi(t)),$$

where m is the constant mass of the tower 12, $\zeta$ is a damping parameter, k is the spring constant, $\psi(t) \in [0, 2\pi)$ is the azimuthal angle of the rotor 16, $a_u$ quantifies the periodic force amplitude, and $\{x, \dot{x}, \ddot{x}\}$ respectively represent the side-to-side displacement, velocity and acceleration of the tower 12 in the hub coordinate system illustrated in FIG. 1.

The second-order mass-spring-damper system may be split into a set of first-order differential equations by defining $x_1=\dot{x}(t)$, $x_2=x(t)$, and may be expressed in state-space form as follows:

$$G(s) \equiv \left\{ \begin{bmatrix} \dot{x}_1 \\ \dot{x}_2 \end{bmatrix} = \begin{bmatrix} -\zeta/m & -\omega_n^2 \\ 1 & 0 \end{bmatrix} \begin{bmatrix} x_1 \\ x_2 \end{bmatrix} + \begin{bmatrix} a_u \\ 0 \end{bmatrix} \cos(\psi(t)) \right\},$$

where $\omega_n=\sqrt{k/m}$ is the structural natural frequency. This state-space form may be referred to as the system model. It is noted that the system model has a nonlinear input or forcing term, namely, $a_u \cos(\psi(t))$. Such a nonlinear term makes it difficult to include the resonance dynamics of the tower 12 in a predictive control model of the wind turbine 10. Hence a transform is first applied to the system model so that it may be more easily incorporated into a wind turbine model that is then used for predictive control. Details of the transform are described below.

Figure 2:
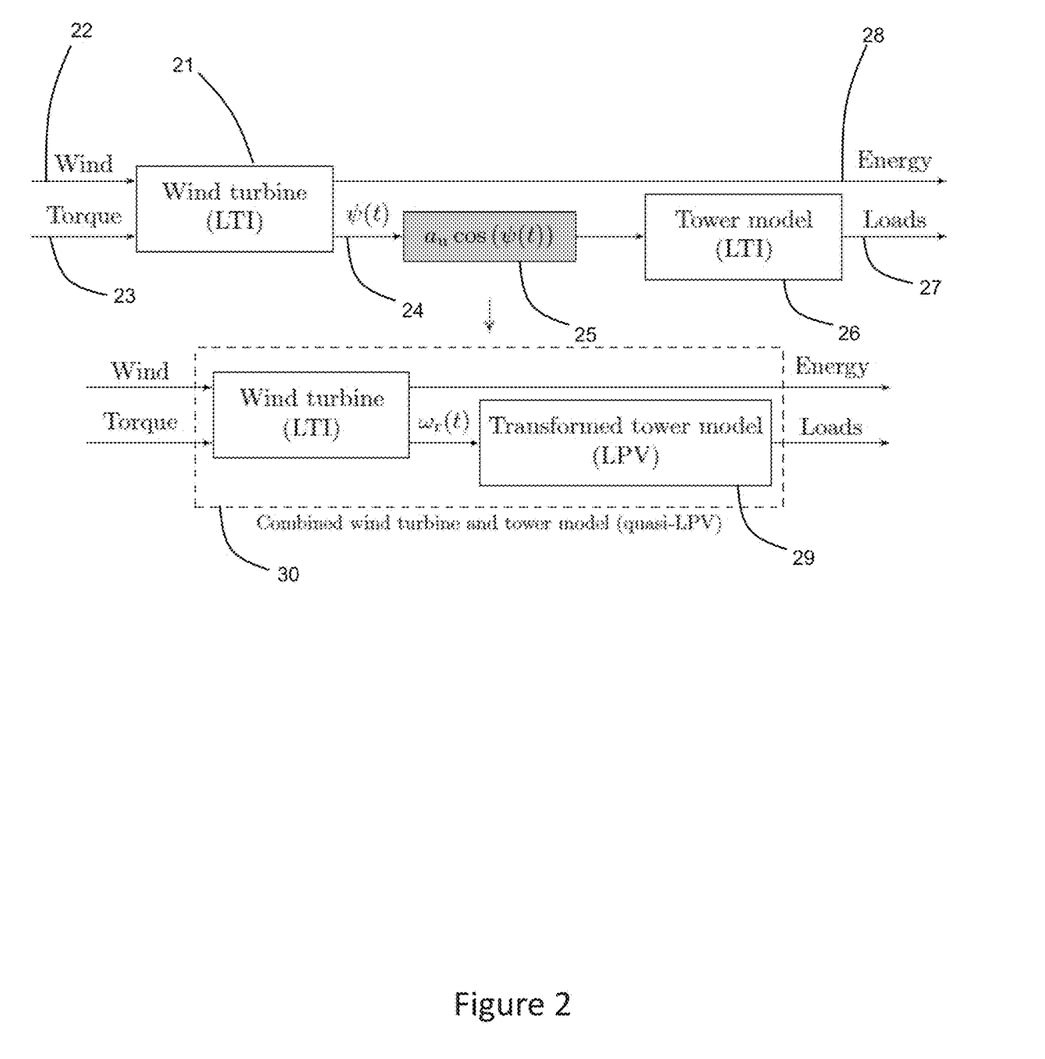
FIG. 2 illustrates a nominal framework of the controller of FIG. 1.

The aim is to provide a trade-off between energy generation efficiency and tower fatigue load reductions by preventing or minimising rotor speed operation near to the tower natural frequency. FIG. 2 shows a graphical representation of the nominal framework. The wind turbine model 21 has a wind disturbance 22 and a generator torque control input 23, the latter of which is subject to optimisation. A cosine function acts on the azimuthal position output 24 from the wind turbine model 21, which results in a periodic or nonlinear input 25 to the tower model 26. The load and energy outputs 27, 28 of the respective tower and wind turbine models 26, 21, together with the torque input signal 23, are included in the following cost function to optimise the energy-load trade-off:

$$\underset{\text{Torque}}{\operatorname{argmin}} \lambda_1(\text{Energy}) + \lambda_2(\text{Loads}) + \lambda_3(\text{Torque})$$

where $\lambda_i$: $i=\{1,2,3\}$ are positive constants determining the objective trade-offs. The load signal 25 is a periodic- and rotor-speed-dependent measure for tower fatigue loading, caused by the presence of the trigonometric function. This presents a problem for describing the objective as a convex optimisation problem. As will be described below, this problem is addressed through aggregation of the nonlinear trigonometric function 25 and the linear time-invariant (LTI) tower model 26 by a model modulation transformation. The transformed tower model 29 results in a linear parameter-varying (LPV) system description. The subsequent combination with a wind turbine model, providing the rotor speed scheduling variable as an internal system state, results in a quasi-LPV model 30. Derivation of the model modulation transformation is provided below.

As mentioned above, the transformation, in particular a modulation transformation, is applied to the system model to obtain a linear (but parameter varying) model description of the tower dynamics. This provides the frequency-dependent dynamical behaviour as a steady-state signal. To achieve this, the transformation relies on an assumption that a change in a response amplitude or oscillation $a_y(\tau)$ and phase $\varphi(\tau)$ of the system is much slower than the periodic excitation frequency $\omega_r$, i.e. in this case the rotor speed, where $\tau$ is a slow timescale relative to the normal timescale t. Variables that are a function of the slow timescale T are assumed to be constant over a single period $T_r=2\pi/\omega_r$ such that $$\int_0^{T_r} f(\tau)g(t)dt = f(\tau)\int_0^{T_r} g(t)dt.$$

By making use of the above identity and by applying a Wiener approach or transform to the system model a new state sequence or transformed model $q=[q_1, q_2, q_3, q_4]^T$ may be obtained and expressed as $$H(s, \omega_r) \equiv \left\{ \begin{bmatrix} \dot{q}_1 \\ \dot{q}_2 \\ \dot{q}_3 \\ \dot{q}_4 \end{bmatrix} = \begin{bmatrix} -\zeta/m & \omega_r & -\omega_n^2 & 0 \\ -\omega_r & -\zeta/m & 0 & -\omega_n^2 \\ 1 & 0 & 0 & \omega_r \\ 0 & 1 & -\omega_r & 0 \end{bmatrix} \begin{bmatrix} q_1 \\ q_2 \\ q_3 \\ q_4 \end{bmatrix} + \begin{bmatrix} a_u \\ 0 \\ 0 \\ 0 \end{bmatrix} \right\}.$$

The instantaneous amplitude (or oscillation) and phase of the dynamic transformed system response at frequency $\omega_r$ are given by $$a_y(\tau)=\sqrt{q_3^2+q_4^2}$$

$$\varphi(\tau)=\tan^{-1}(q_4/q_3).$$

It is seen that the nominal periodically-excited second-order system model of the resonance dynamics of the tower 12 is transformed into a linear parameter varying (LPV) structure, referred to as the transformed model.

Figure 3A:
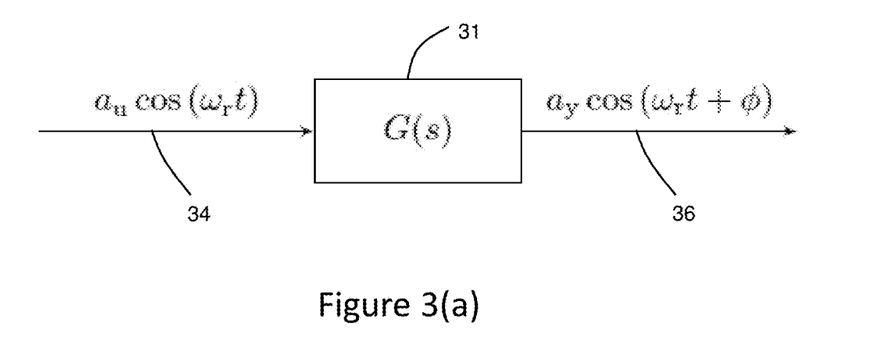
FIG. 3(a) illustrates a linear time-invariant (LTI) transform that may be applied to a wind turbine tower model.
Figure 3B:
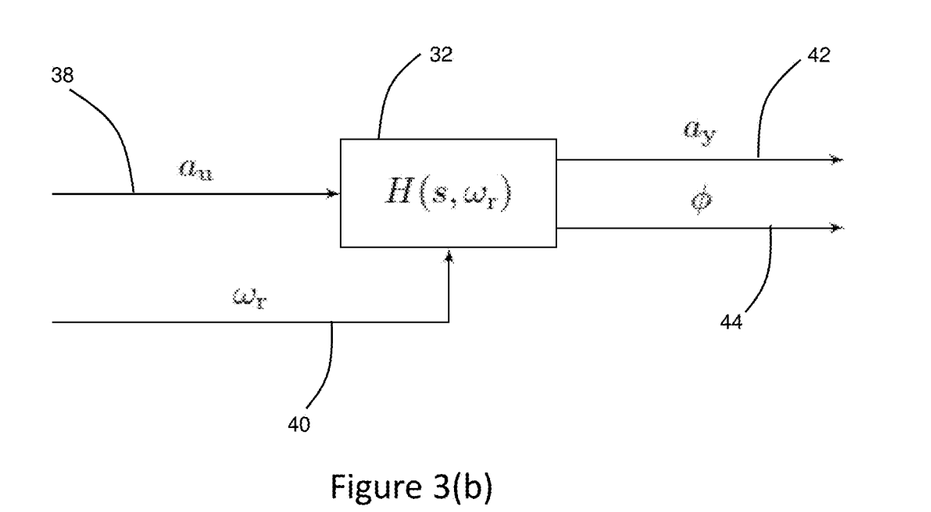
FIG. 3(b) illustrates a linear parameter varying (LPV) transform applied to a wind turbine tower model defined in the controller of FIG. 1.

FIGS. 3(a) and 3(b) respectively show the inputs to, and outputs from, the transforms G(s) 31 and H(s, $\omega_r$) 32. In particular, FIG. 3(a) shows that the nominal system model of the tower 12 is periodically excited at a certain frequency and amplitude, i.e. it has a nonlinear input or forcing term $a_u \cos(\omega_r t)$ 34. The response 36 is scaled and phase-shifted with respect to the input signal 34. Specifically, the response 36 may be expressed as $a_y \cos(\omega_r t+\varphi)$. That is, the response 36 is also a nonlinear term. In contrast, FIG. 3(b) shows that the transformed system has a linear input. In particular, the periodic input amplitude $a_u$ 38 is a direct input to the transformed system. The frequency $\omega_r$ 40 is also an input to the transformed system; however, it may be seen above that this is not a direct input and instead appears in the system state. The frequency $\omega_r$ 40 therefore changes the system dynamics and is a scheduling parameter of the system. Also in contrast to FIG. 3(a), FIG. 3(b) shows that the outputs from the transformed model are linear and, specifically, the outputs are the response amplitude or oscillation $a_y$ 42 and the response phase shift $\varphi$ 44.

Figure 4A:
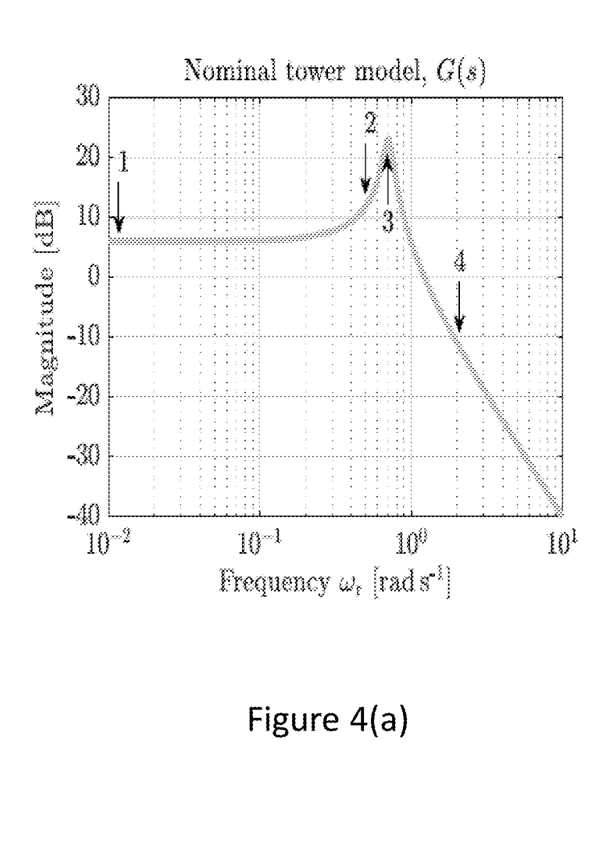
FIG. 4 shows a plot of tower oscillation magnitude against rotor speed using the LTI transform of FIG. 3(a), the plot showing an interval of rotor speeds defining an exclusion zone.
Figure 4B:
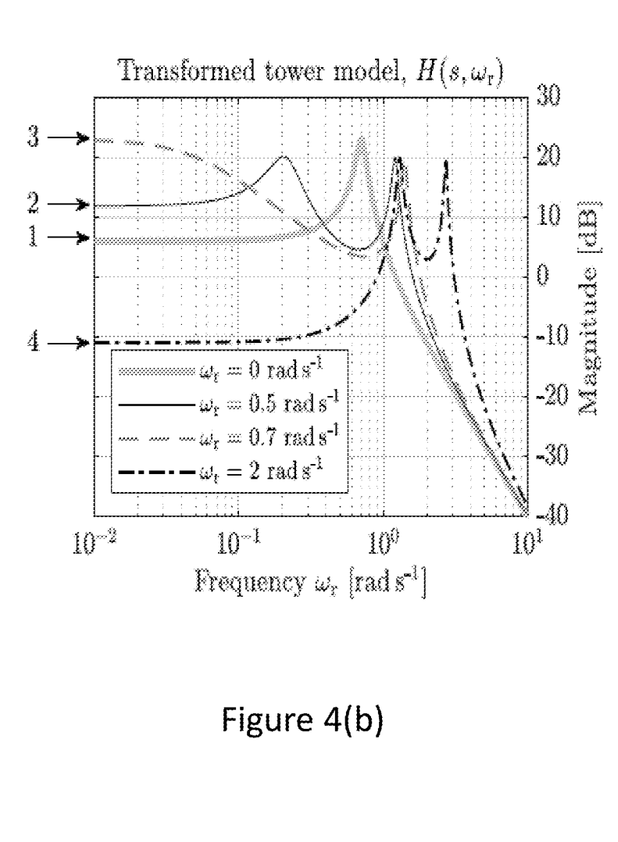

FIGS. 4(a) and 4(b) show Bode magnitude plots of the nominal plant model, i.e. the system model, and its modulated counterpart, i.e. the transformed model. To obtain the frequency response of the transformed model, the Euclidean norm of the responses of $q_3$ and $q_4$ at each frequency point is taken to obtain the amplitude output $a_y(\tau)$ using the relationship given above. The natural frequency $\omega_n = \sqrt{k/m}$ is the same frequency as the clearly present resonance peak.

A set of four evaluation frequencies is chosen as to $\{\omega_{r,1}, \omega_{r,2}, \omega_{r,3}, \omega_{r,4}\} = \{0, 0.5, 0.7, 2.0\}$ rad s$^{-1}$ to show the effects of the transformation by indicative pointers in FIGS. 4(a) and 4(b). It is shown for $\omega_{r,1}$ that the transformed model reduces to the nominal case. For $\{\omega_{r,i} \forall i>1\}$ the magnitude content is transferred to a DC contribution for each evaluation of $H(j\omega, \omega_{r,i})$. Moreover, the nominal resonance peak at $\omega_n$ is for each frequency response split into two peaks with a 3 dB magnitude reduction. When the input amplitude $a_u$ 38 of the transformed model is varied slowly, the magnitudes from specific frequency points of the nominal model are mapped to a DC contribution in the transformed case. Rapid variations will result in contributions from the resonances at higher frequencies.

Figure 5:
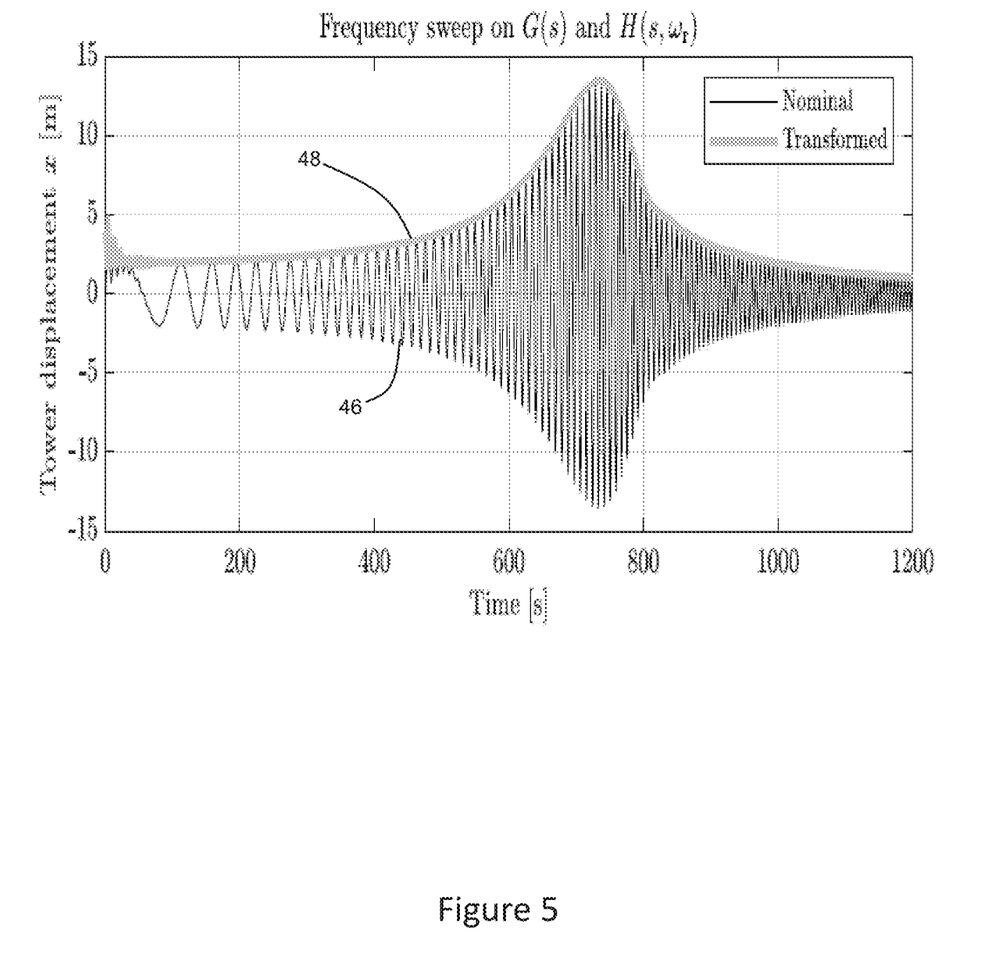
FIG. 5 shows a plot of tower displacement against time using the LTI transform of FIG. 3(a), and also shows a plot of the oscillation amplitude against time using the LPV transform of FIG. 3(b)

The effect of the transformation in the time domain is evaluated in FIG. 5. Both the nominal system model and the transformed model are fed with a linear increasing frequency, at a constant frequency acceleration rate of $\dot{\omega}_r = 0.01$ rad s$^{-1}$ for a period of 1200 s, starting from $\omega_r = 0$ to 1.2 rad s$^{-1}$. In particular, FIG. 5 shows temporal displacement 46 of the tower 12 according to the nominal system model, and also temporal amplitude 48 of the tower oscillations according to the transformed model. The transformed model shows a very close amplitude tracking of the nominal system model dynamics.

A model for the dynamics of the wind turbine 10 is now derived for augmentation to the transformed model for the resonance dynamics of the wind turbine tower 12 to obtain a quasi-LPV model. As the dynamics of the transformed tower model are scheduled by the input excitation frequency 40, which in this case is the rotor speed $\omega_r$, it is a logical step to augment a wind turbine model adding this variable to the overall system description.

The considered first-order wind turbine model is $$J_r \dot{\omega}_r = \tau_a - N(\tau_g + \Delta\tau_g),$$

where $J_r$ is the total rotor inertia consisting of the hub inertia and three times the blade inertia, $N \geq 1$ is the gearbox ratio, and $\tau_a$ is the aerodynamic rotor torque defined as $$\tau_a = \tfrac{1}{2} \rho_a \pi R^3 U^2 C_\tau(\lambda, \beta),$$

where $\rho_a$ is the air density, R is the rotor radius, U is the rotor effective wind speed and $C_\tau$ is the torque coefficient as a function of the blade pitch angle $\beta$ and the dimensionless tip-speed ratio $\lambda = \omega_r R/U$. The system torque $\tau_s = N(\tau_g + \Delta\tau_g)$ is a summation of the generator torque $\tau_g$ resulting from a standard 'K-omega-squared' torque control law and an additional torque contribution $\Delta\tau_g$ resulting from the model predictive control (MPC) framework described below. The torque control law is taken as an integral part of the model, and is defined as $$\tau_g = K\omega_r^2/N$$

where K is the optimal mode gain $$K = \frac{\pi \rho_a R^5 C_p(\lambda, \beta)}{2\lambda^3}$$

calculated for the low-speed shaft side in Nm.

The wind turbine differential equation is augmented to the transformed tower model to give $$\begin{bmatrix} \dot{q}_1 \\ \dot{q}_2 \\ \dot{q}_3 \\ \dot{q}_4 \\ \dot{\omega}_r \end{bmatrix} = \begin{bmatrix} -\zeta/m & \omega_r & -\omega_n^2 & 0 & 0 \\ -\omega_r & -\zeta/m & 0 & -\omega_n^2 & 0 \\ 1 & 0 & 0 & \omega_r & 0 \\ 0 & 1 & -\omega_r & 0 & 0 \\ 0 & 0 & 0 & 0 & 0 \end{bmatrix} \begin{bmatrix} q_1 \\ q_2 \\ q_3 \\ q_4 \\ \omega_r \end{bmatrix} +$$

$$\begin{bmatrix} a_u \\ 0 \\ 0 \\ 0 \\ (\tau_a - N(\tau_g + \Delta\tau_g))/J_r \end{bmatrix}$$

$$a_y = \sqrt{q_3^2 + q_4^2}.$$

This model description includes the above-defined nonlinear aerodynamic and generator torque input, and the output is a nonlinear combination of a part of the state.

The wind turbine model may be linearized about a considered linearization point by taking partial derivatives with respect to the state and input vectors so as to obtain a linear state-space description of the model. Also, the aerodynamic rotor torque may be linearized with respect to the rotor speed and wind speed.

For each operating point, corresponding steady-state values may be substituted into the state-space model by making use of a function $f(\omega_r(t))$, i.e. a function of the rotor speed, which schedules the state, input and output matrices of the state-space model. This means that the nonlinear dynamics of the wind turbine model may be described by a set of linear models and varying the system description according to the operating point parameterised by the function $f(\omega_r(t))$. For the quasi-LPV case, or simply qLPV case, the scheduling variable is part of the state, which makes the system self-scheduling for each time step.

The computational complexity of nonlinear MPC make it often unsuitable for application in fast real-world systems such as wind turbines. However, the inherent property of a qLPV system in which a part of the system state is used as a scheduling mechanism may be used to form a qLPV-MPC framework having reduced computational complexity.

An economic MPC approach is used to directly optimise an economic performance of the wind turbine 10. That is, a predefined performance criterion specifies the trade-off between power extraction efficiency and load mitigations, and finds an optimal control signal resulting in minimisation of the criterion. The nonlinear MPC control problem may be solved by an iterative method, in particular by solving subsequent quadratic programs (QP) minimising the predefined cost, and using the resulting predicted scheduling sequence as a 'warm-start' for the next iteration upon convergence.

A forward propagation expression may be derived for prediction of the qLPV model output $Y_{k+1}$ by manipulation of the linearized state-space model of the wind turbine 10, where $Y_{k+1}$ is dependent on a number of scheduling variables $P_k = [p_k, p_{k+1}, p_{k+N_p}] \in \mathbb{R}^{n_p \times N_p}$ at each time instant over a prediction horizon $N_p$. At time instance k=0 only the initial state is assumed to be known, and the prediction variables are chosen to be constant over the prediction horizon. By assuming this initialisation, the QP is solved for $\Delta\Theta_{g,k+1} = [\Delta T_{g,k+1} \ldots \Delta\tau_{g,k+N_p}] \in \mathbb{R}^{N_p}$ by minimising the cost $$\operatorname*{argmin}_{\Delta\Theta_{g,k+1}} J = Y_{k+1}^T Q Y_{k+1} + \Delta\Theta_{g,k+1}^T R \Delta\Theta_{g,k+1}$$

subject to the dynamical system $Y_{k+1}$, where $Q = \operatorname{diag}(Q, Q, \ldots, Q) \in \mathbb{R}^{N_p \times N_p}$ and $R = \operatorname{diag}(R, R, \ldots, R) \in \mathbb{R}^{N_p \times N_p}$ are, respectively, weight matrices acting on the predicted output tower amplitude and deviation from the optimal input 'K-omega-squared' torque control signal. A trade-off between produced power and load reductions is conveniently obtained by varying the weights Q and R.

The inherent qLPV property may now be used, and the predicted evolution of the state is used as a warm-up initialisation of the scheduling variables P in the next iteration. The iterative process is repeated until a metric, e.g. the 2-norm, between consecutive predictions of the model output $Y_{k+1}$ is within a predetermined error threshold. The described iterative process is only used in the initial time step k=0. That is, the scheduling vector $P_k$ is found iteratively during the first time step, and then warm-starting is used for subsequent time instances.

An example in which the described qLPV-MPC framework is used is now described. The transformed second-order tower model is driven by its measured rotor speed, forming the complete qLPV state vector $q_k$. The state is used at each time instant for forward propagation of the model. The below example illustrates that the qLPV-MPC successfully guards against rotor operation coinciding with the tower resonance frequency.

Figure 6:
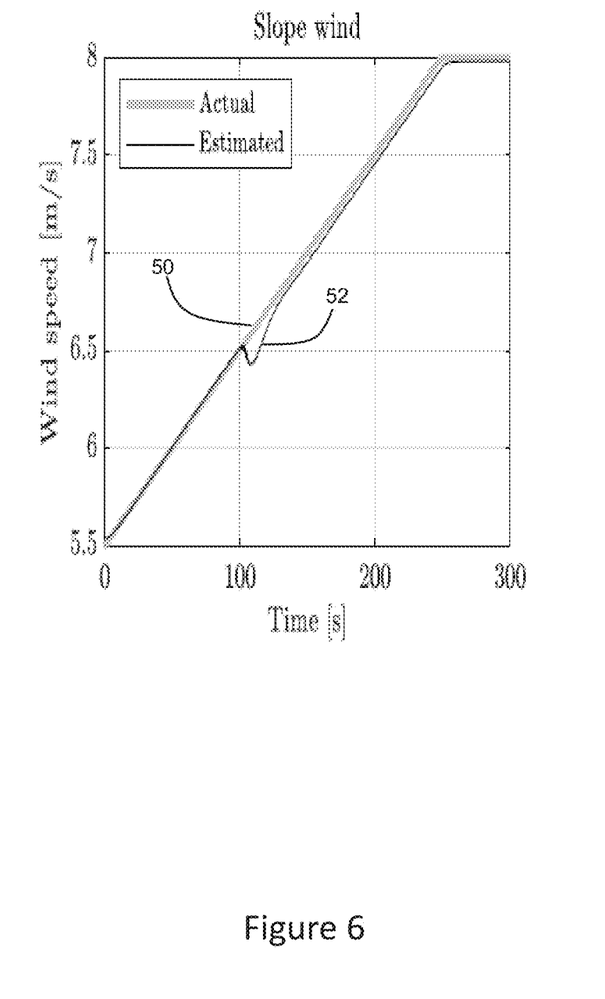
FIG. 6 shows plots of the wind speeds in the vicinity of the wind turbine of FIG. 1 in the case of linearly increasing wind speed over time for both a conventional control law and an estimation according to the LPV transform of FIG. 3(b)
Figure 7A:
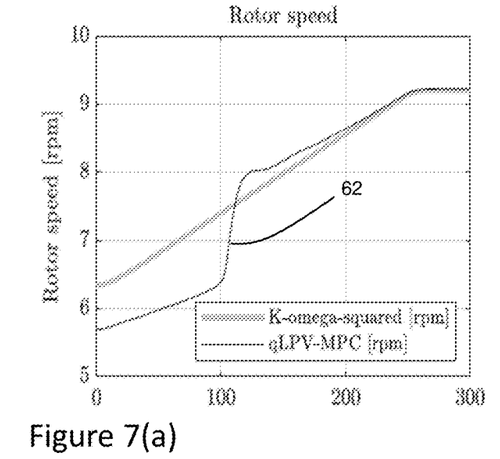
FIGS. 7(a), 7(b), 7(c), and 7(d) show plots of wind turbine dynamics against time determined by the controller of FIG. 1 for the wind speed of FIG. 6 for both a conventional control law and an estimation according to the LPV transform of FIG. 3(b) where, in particular, FIGS. 7(a), 7(b), 7(c), and 7(d) respectively show plots of rotor speed, oscillation amplitude, generator power, and generator torque.
Figure 7B:
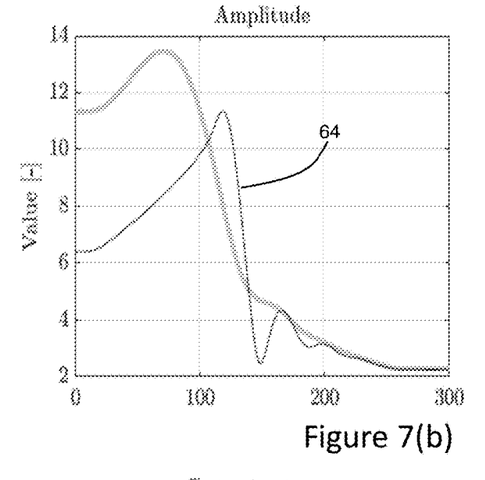
Figure 7C:
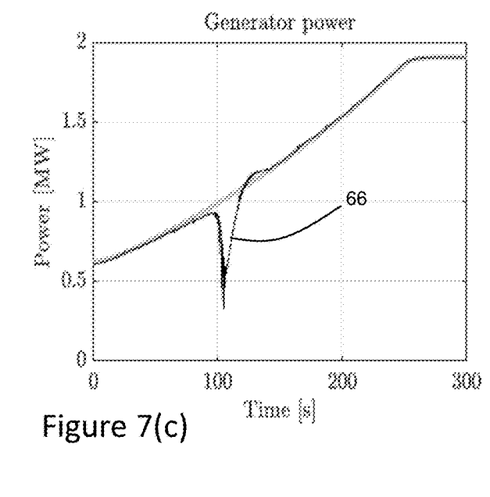
Figure 7D:
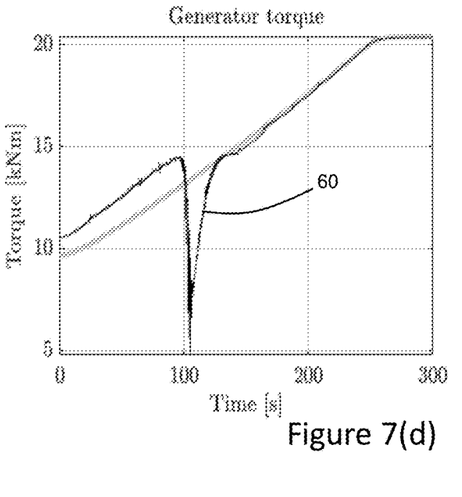

The described example includes initialising the wind turbine 10 for operating conditions corresponding to a wind speed of U=5.5 m s$^{-1}$, followed by a linearly increasing slope of the wind to a maximum speed of U=8.0 m s$^{-1}$ in approximately 250 S. FIG. 6 shows the applied wind signal 50 in the described example. As the wind speed cannot be assumed to be measurable in practice, an effective immersion and invariance rotor effective estimation of the wind speed 52 is used, and this is also shown in FIG. 6. As the estimated wind speed 52 takes the generator torque and rotor speed as inputs, and a rapid rotor and generator torque change occurs at around 100 s, then a discrepancy is seen at around this time. As the future wind speed is unknown at time instance k then its evolution is chosen to be constant over the prediction horizon.

The sampling time is set to $T_s$=1.0 S. This relatively low sampling interval is possible because the modulation transformation moves the load signal to a quasi-steady state contribution. As a result of this transformation, the algorithm's goal is to find the optimal operating trajectory, and not to actively mitigate a specific frequency. The low sampling interval is especially convenient for real-world applications as this allows solving the QP less frequently, reducing the need for powerful control hardware.

FIGS. 7(*a*), 7(*b*), 7(*c*), and 7(*d*) present results for the described example. In particular, FIGS. 7(*a*), 7(*b*), 7(*c*), and 7(*d*) respectively show plots of the rotor speed, amplitude, generator power and generator torque against time. Specifically, FIGS. 7(*a*), 7(*b*), 7(*c*), and 7(*d*) show a comparison against convention 'K-omega-squared' torque control with a linearly increasing wind speed. The input and output weighting factors have been chosen to be Q=0.1, R=25, and the prediction horizon $N_p$ and control horizon $N_c$ are set to $N_p$=$N_c$=25. FIGS. 7(*a*), 7(*b*), 7(*c*), and 7(*d*) illustrate the capability of the algorithm to withhold the wind turbine 10 from operating at a rotational speed that excites the tower natural frequency by increasing $\Theta_{g,k+1}$, i.e. by increasing the additional torque contribution resulting from the MPC framework.

At around 100 s the wind speed is sufficient for the load and power trade-off to be in favour of a rotational speed in the vicinity a rotor speed that will excite the tower natural frequency. This is dealt with by the algorithm by causing a swift reduction of the generator torque 60 (as shown in FIG. 7(*d*)) resulting in a rapid crossing of the rotor speed $\omega_r$ 62 the critical rotor speed $\omega_r = \omega_n = 6.75$ rpm (as shown in FIG. 7(*a*)). The tower displacement shows a reduction in response amplitude 64 (as shown in FIG. 7(*b*)) by excitation of the natural frequency for a shorter period of time. It is clear that this comes at the expense of generated power 66 when the switching occurs, and this is reflected by the drop in generator power at around 100 s (as shown in FIG. 7(*c*)). Expressed differently, the algorithm acts to prevent the rotor speed exciting the tower's natural frequency by imposing an additional torque demand. Then, when the wind speed is sufficient for the operation at a higher rotor speed 62, the additional generator torque 60 is rapidly reduced to facilitate a swift crossing of the critical frequency $\omega_n$. The strategy is beneficial for reducing periodic tower loading, at the expense of generated power 66.

Figure 8:
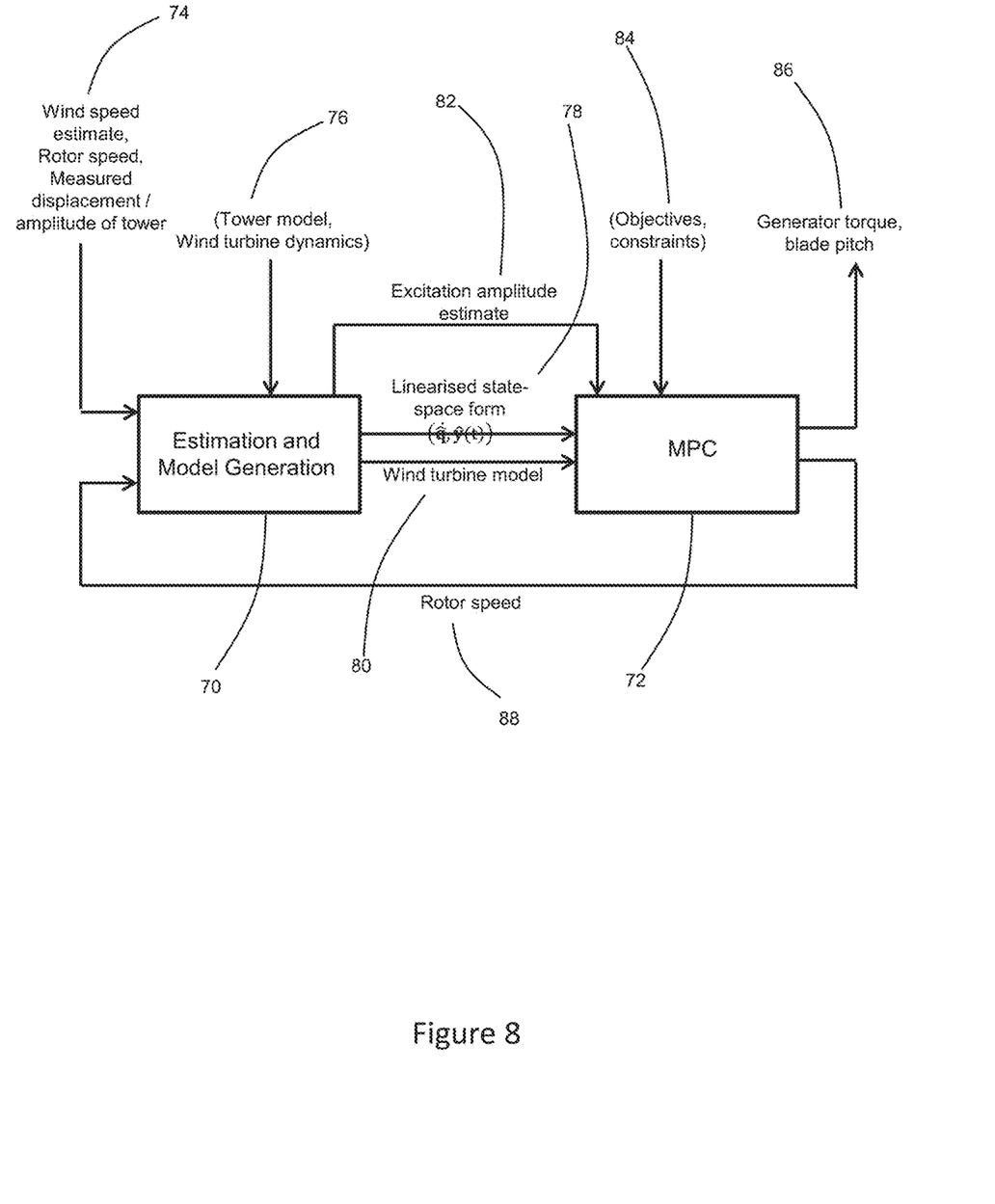
FIG. 8 is a schematic diagram of the controller of FIG. 1, showing the component modules of the controller, namely estimator and model predictive control (MPC) modules, together with the inputs and outputs thereto.

FIG. 8 schematically shows the controller 20 of the described embodiment, in particular the modules within the controller 20 together with their inputs and outputs. These modules operate in accordance with the approach described above. The controller 20 includes an estimator and model generation module or unit 70 and an MPC module or unit 72. The estimator and model generation module 70 takes as inputs 74 measurements of the rotor speed and tower displacement, and an estimate of the wind speed. Alternatively, an estimate of the wind speed may be made in the estimator module 70. Models for the wind turbine tower 12 and dynamics of the wind turbine 10, in particular parameters for use in these models, are also received as inputs 76 to the estimator and model generation module 70.

The transformed model of the wind turbine 10 and the linearized state-space form are received as inputs 78, 80 by the MPC module 72 from the estimation and model generation module 70. An estimate of the excitation amplitude is also received as an input 82 by the MPC module 72 from the estimator and model generation module 70.

The objectives and constraints, e.g. the cost function described above, on which the MPC algorithm is to be applied to the wind turbine model, are received as an input 84 by the MPC module 72.

The MPC module 72 runs the model-based control algorithm, in this embodiment the MPC algorithm, based on the inputs 78, 80, 82, 84 and provides as an output 86 one or more control signals for controlling rotor speed the wind turbine 10. In particular, the rotor speed is controlled to penalise operation at rotor speeds corresponding to the resonance response oscillation amplitude of the wind turbine tower 12. Specifically, the MPC module 72 determines an optimal trade-off between maximising power production efficiency of the wind turbine 10 and minimising operation of the wind turbine 10 at rotor speeds corresponding to the resonance response oscillation amplitude of the wind turbine tower 12. The MPC module 72 also provides rotor speed as an output 88 that is fed back to the estimation and model generation module 70.

Figure 9:
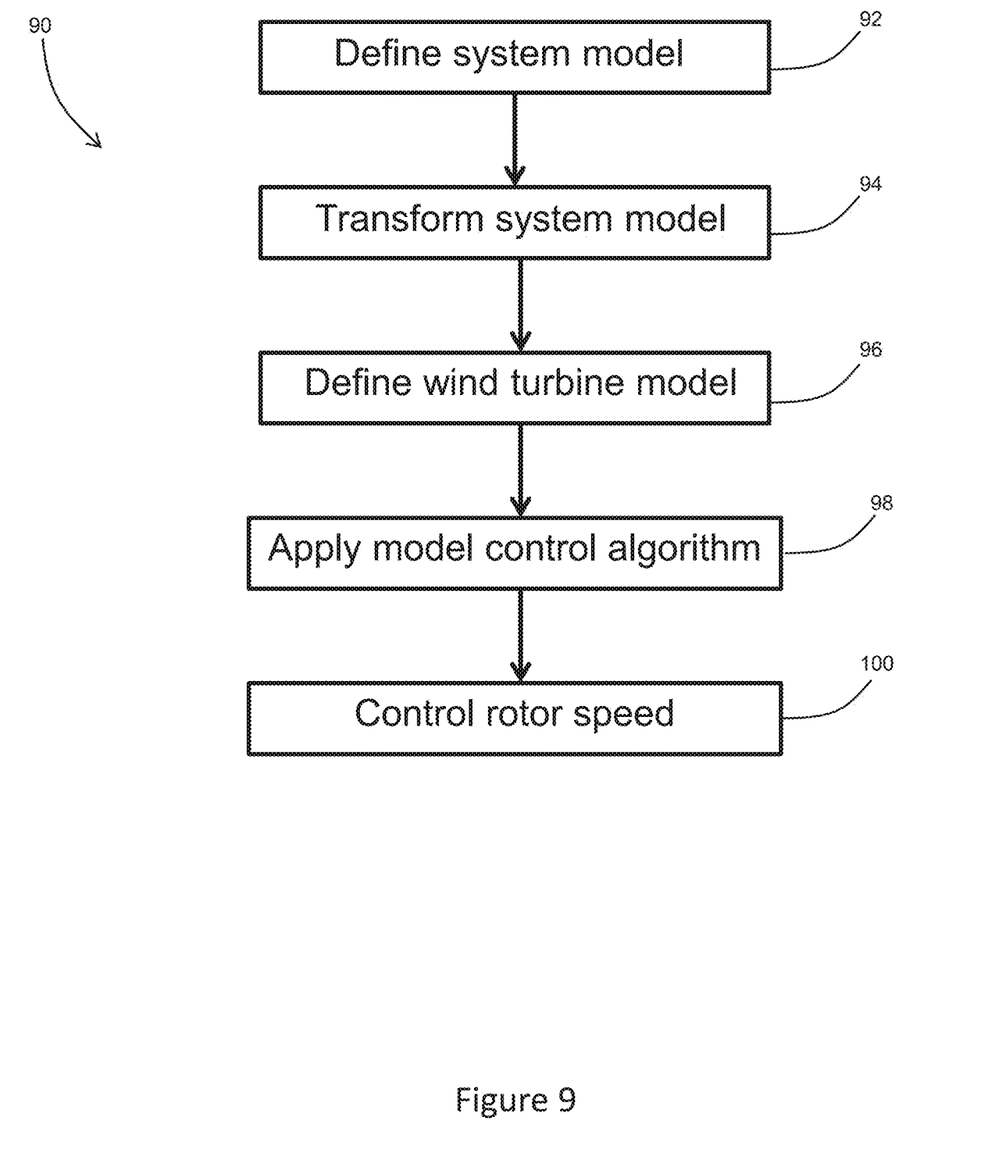
FIG. 9 shows the steps of a method undertaken by the controller of FIG. 8.

FIG. 9 summarises steps of a method 90 undertaken by the controller 20, as is outlined above for the described embodiment. At step 92, a system model for resonance dynamics of the wind turbine tower 12 is defined by the estimator and model generation module 70 on the basis of parameters received into the module 70. As described above, this system model has a nonlinear input or forcing term. At step 94, the estimator and model generation module 70 applies a transform to the system model as described above, for example by application of a Wiener transform or approach, to obtain a transformed model for response oscillation amplitude of the wind turbine tower 12. This transformed model has a linear forcing term. At step 96, the estimator and model generation module 70 defines a model for the dynamics of the wind turbine 10 on the basis of parameters received into the module 70 and that includes the transformed model of the wind turbine tower 12. At step 98, the MPC module 72 applies a model-based control algorithm using the wind turbine model, or a linearized version thereof, to determine at least one control output of the module 72. At step 100, the controller 20 sends a control signal based on the at least one control output to control rotor speed of the wind turbine 10. The control output(s) may be any suitable controllable parameter that may be used to control rotor speed, for example generator torque or rotor blade pitch.

Wind turbine rotor assemblies possess a mass imbalance which can lead to excitation of the wind turbine tower side-to-side natural frequency during below rated operation. There are no efficient and intuitive, convex MPC approaches available for preventing rotor speed operation at this frequency. The above describes a model transformation combined with an efficient, non-linear MPC scheme that exploits the inherent properties of a quasi-LPV model structure. Advantageously, the rotor speed is thereby prevented from operating at the tower natural frequency by deviating from the optimal aerodynamic operation trajectory. The nonlinear MPC approach involves finding the LPV scheduling sequence by performing multiple iterative QP solves for the first time step. Subsequent time steps only require a single QP solve using a scheduling sequence warm start. The MPC algorithm prevents excessive natural frequency excitation by sacrificing an insignificant amount of produced energy.

Many modifications may be made to the above-described embodiments without departing from the scope of the present invention as defined in the accompanying claims.

In the described embodiment, a second-order system is used to model the dynamics of the tower 12; however, in different embodiments higher-order models may be used and would result in a similar subsequent analysis.

In the above-described embodiment, resonance dynamics of the wind turbine tower is included in the wind turbine model for application of a model-based control algorithm. In different embodiments, however, natural frequency dynamics (structural resonance dynamics with rotational frequency) of other wind turbine components may instead, or additionally, be included in the wind turbine model using the transformation described above. For example, drivetrain tonalities may be included, where a combination of speed and torque can excite the wind turbine blade shell or nacelle cover at audible frequencies potentially leading to a noise problem.

In the above-described embodiment, a predictive control method, in particular a model predictive control method, is used to determine at least one control output, e.g. generator torque, for controlling rotor speed of the wind turbine. In different embodiments, however, the method used to determine the control output(s) need not be a predictive control method and may instead be a general model-based control method. Examples of such methods may include a linear-quadratic regulator (LQR) control method, a linear-quadratic-Gaussian (LQG) control method, and an H-infinity control method.

The invention claimed is:

1. A method for controlling rotor speed of a wind turbine, the method comprising:
    defining a system model describing resonance dynamics of a wind turbine component, the system model having a nonlinear input term;
    applying a transform to the system model to obtain a transformed model for a response oscillation amplitude of the wind turbine component, the transformed model having a linear input term;
    defining a wind turbine model describing dynamics of the wind turbine, the wind turbine model including the transformed model of the wind turbine component; and
    applying a model-based control algorithm using the wind turbine model to determine at least one control output, and using the at least one control output to control rotor speed of the wind turbine.

2. The method according to claim 1, wherein applying the model-based control algorithm comprises:
    predicting response oscillation amplitude of the wind turbine component over a prediction horizon using the wind turbine model; and
    determining the at least one control output based on the predicted response oscillation amplitude.

3. The method according to claim 2, further comprising using the predicted response oscillation amplitude in a cost function of the wind turbine model, and optimising the cost function to determine the at least one control output.

4. The method according to claim 3, wherein the cost function includes a penalty parameter associated with the predicted response oscillation amplitude to penalise operating the wind turbine at rotor speeds corresponding to a resonance response oscillation amplitude of the wind turbine component.

5. The method according to claim 4, wherein optimising the cost function comprises determining an optimal trade-off between maximising power production efficiency of the wind turbine and minimising operation of the wind turbine at rotor speeds corresponding to the resonance response oscillation amplitude of the wind turbine component.

6. The method according to claim 3, wherein optimising the cost function comprises performing a convex optimisation on the cost function.

7. The method according to claim 1, wherein the transformed model is a linear parameter varying (LPV) model.

8. The method according to claim 7, wherein wind turbine rotor speed is a scheduling parameter of the LPV model.

9. The method according to claim 1, wherein determining the transformed model comprises application of a Wiener approach to the system model.

10. The method according to claim 1, wherein the linear input term in the transformed model includes a periodic frequency varying force applied to the wind turbine component.

11. The method according to claim 1, wherein the system model describes a displacement of the wind turbine component.

12. The method according to claim 1, wherein the wind turbine component is a wind turbine tower.

13. A non-transitory, computer readable storage medium storing instructions thereon that when executed by a processor causes the processor to perform an operation for controlling rotor speed of a wind turbine, the operation comprising:

defining a system model describing resonance dynamics of a wind turbine component, the system model having a nonlinear input term;

applying a transform to the system model to obtain a transformed model for a response oscillation amplitude of the wind turbine component, the transformed model having a linear input term;

defining a wind turbine model describing dynamics of the wind turbine, the wind turbine model including the transformed model of the wind turbine component; and applying a model-based control algorithm using the wind turbine model to determine at least one control output, and using the at least one control output to control rotor speed of the wind turbine.

14. The computer readable storage medium according to claim 13, wherein applying the model-based control algorithm comprises:

predicting response oscillation amplitude of the wind turbine component over a prediction horizon using the wind turbine model; and determining the at least one control output based on the predicted response oscillation amplitude.

15. The computer readable storage medium according to claim 14, the operation further comprising using the predicted response oscillation amplitude in a cost function of the wind turbine model, and optimising the cost function to determine the at least one control output.

16. A controller for controlling rotor speed of a wind turbine, the controller being configured to:

define a system model describing resonance dynamics of a wind turbine component, the system model having a nonlinear input term;

apply a transform to the system model to obtain a transformed model for a response oscillation amplitude of the wind turbine component, the transformed model having a linear input term;

define a wind turbine model describing dynamics of the wind turbine, the wind turbine model including the transformed model of the wind turbine component; and apply a model-based control algorithm using the wind turbine model to determine at least one control output, and use the at least one control output to control rotor speed of the wind turbine.

17. The controller according to claim 16, wherein applying the model-based control algorithm comprises:

predicting response oscillation amplitude of the wind turbine component over a prediction horizon using the wind turbine model; and determining the at least one control output based on the predicted response oscillation amplitude.

18. The controller according to claim 17, wherein the controller is further configured to:

use the predicted response oscillation amplitude in a cost function of the wind turbine model; and optimise the cost function to determine the at least one control output.

19. A wind turbine comprising:

a tower;

a nacelle disposed on the tower;

a rotor extending from the nacelle and having a plurality of blades disposed at a distal end; and a controller for controlling rotor speed of a wind turbine, the controller being configured to:

define a system model describing resonance dynamics of a wind turbine component, the system model having a nonlinear input term;

apply a transform to the system model to obtain a transformed model for a response oscillation amplitude of the wind turbine component, the transformed model having a linear input term;

define a wind turbine model describing dynamics of the wind turbine, the wind turbine model including the transformed model of the wind turbine component; and apply a model-based control algorithm using the wind turbine model to determine at least one control output, and use the at least one control output to control rotor speed of the wind turbine.

* * * * *